United States Patent
Nainar et al.

(10) Patent No.: US 10,972,377 B2
(45) Date of Patent: Apr. 6, 2021

(54) COORDINATED OFFLOADED RECORDING OF IN-SITU OPERATIONS, ADMINISTRATION, AND MAINTENANCE (IOAM) DATA TO PACKETS TRAVERSING NETWORK NODES

(71) Applicant: Cisco Technology, Inc., San Jose, CA (US)

(72) Inventors: Nagendra Kumar Nainar, Morrisville, NC (US); Carlos M. Pignataro, Cary, NC (US); Frank Brockners, Cologne (DE); Shwetha Subray Bhandari, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 15 days.

(21) Appl. No.: 16/231,096

(22) Filed: Dec. 21, 2018

(65) Prior Publication Data

US 2020/0145318 A1    May 7, 2020

(30) Foreign Application Priority Data

Nov. 2, 2018 (IN) .............................. 201841041524

(51) Int. Cl.
*H04L 12/715* (2013.01)
*H04L 12/751* (2013.01)
(Continued)

(52) U.S. Cl.
CPC .......... *H04L 45/04* (2013.01); *H04L 41/0246* (2013.01); *H04L 45/02* (2013.01); *H04L 45/74* (2013.01); *H04L 69/22* (2013.01)

(58) Field of Classification Search
None
See application file for complete search history.

(56) References Cited

U.S. PATENT DOCUMENTS

2012/0155283 A1\* 6/2012 Sanguineti .......... H04L 41/0226
                                                            370/241.1
2015/0124626 A1\* 5/2015 Sul .......................... H04L 43/10
                                                            370/241.1

(Continued)

OTHER PUBLICATIONS

Deering et al., "Internet Protocol, Version 6 (IPv6) Specification," Dec. 1998, RFC 2460, The Internet Society, Reston, VA, USA (thirty-nine pages).

(Continued)

*Primary Examiner* — Gregory B Sefcheck
*Assistant Examiner* — Srinivasa R Reddivalam
(74) *Attorney, Agent, or Firm* — The Law Office Of Kirk D. Williams

(57) ABSTRACT

In one embodiment, network nodes coordinate recording of In-Situ Operations, Administration, and Maintenance (IOAM) data in packets traversing the network nodes, including a node adding IOAM data of another node to packets on behalf of the another node. After receiving a particular packet, a network node adds first IOAM data and second IOAM data to the particular packet, with the first IOAM data related to the first network node and the second IOAM data related to a second network node. The packet is then sent from the first network node. The coordinated offloading of the adding of IOAM data to packets allows a node to free up resources currently used for IOAM operations to be used for other packet processing operations, while still having IOAM data related to the node recorded in packets. The coordinated offloading may include control plane communication (e.g., via a routing or other protocol).

18 Claims, 6 Drawing Sheets

(51) Int. Cl.
*H04L 29/06* (2006.01)
*H04L 12/24* (2006.01)
*H04L 12/741* (2013.01)

(56) References Cited

U.S. PATENT DOCUMENTS

| | | | |
|---|---|---|---|
| 2016/0315819 A1 | 10/2016 | Dara et al. | |
| 2016/0315850 A1 | 10/2016 | Dara et al. | |
| 2016/0315921 A1 | 10/2016 | Dara et al. | |
| 2017/0339072 A1 | 11/2017 | Pignataro et al. | |
| 2018/0278548 A1 | 9/2018 | Pignataro et al. | |
| 2018/0331890 A1* | 11/2018 | Song | H04L 12/56 |
| 2018/0331933 A1* | 11/2018 | Song | H04L 29/0653 |
| 2019/0222442 A1* | 7/2019 | Wei | H04L 12/5602 |
| 2020/0162307 A1* | 5/2020 | Chen | H04L 41/0226 |

OTHER PUBLICATIONS

Deering et al., "Internet Protocol, Version 6 (IPv6) Specification," Jul. 2017, RFC 8200, The Internet Society, Reston, VA, USA (forty-two pages).

Carpenter et al., "Transmission and Processing of IPv6 Extension Headers," Dec. 2013, RFC 7045, The Internet Society, Reston, VA, USA (ten pages).

Elkins et al., "IPv6 Performance and Diagnostic Metrics (PDM) Destination Option," Sep. 2017, RFC 8250, The Internet Society, Reston, VA, USA (thirty pages).

Brockners et al., "Requirements for In-situ OAM," Mar. 13, 2017, draft-brockners-inband-oam-requirements-03, The Internet Society, Reston, VA, USA (twenty-four pages).

Brockners et al., "Data Fields for In-situ OAM," Jul. 2, 2017, draft-brockners-inband-oam-data-07, The Internet Society, Reston, VA, USA (twenty-nine pages).

Brockners et al., "Encapsulations for In-situ OAM Data," Jul. 2, 2017, draft-brockners-inband-oam-transport-05, The Internet Society, Reston, VA, USA (thirty pages).

Brockners et al., "Geneve encapsulation for In-situ OAM Data," Jun. 27, 2018, draft-brockners-ippm-ioam-geneve-01, The Internet Society, Reston, VA, USA (ten pages).

Brockners et al., "VXLAN-GPE Encapsulation for In-situ OAM Data," Jun. 27, 2018, draft-brockners-ippm-ioam-vxlan-gpe-01, The Internet Society, Reston, VA, USA (ten pages).

Brockners et al., "Data Fields for In-situ OAM," Oct. 30, 2017, draft-ietf-ippm-ioam-data-01, The Internet Society, Reston, VA, USA (twenty-nine pages).

Brockners et al., "Data Fields for In-situ OAM," Jun. 27, 2018, draft-ietf-ippm-ioam-data-03, The Internet Society, Reston, VA, USA (thirty-five pages).

Song and Zhou, "In-situ OAM Data Type Extension," Apr. 16, 2018, draft-song-ippm-ioam-data-extension-01, The Internet Society, Reston, VA, USA (seven pages).

Bhandari et al., "In-situ OAM IPv6 Options," Jun. 29, 2018, draft-ioametal-ippm-6man-ioam-ipv6-options-00, The Internet Society, Reston, VA, USA (nine pages).

Weis et al., "GRE Encapsulation for In-situ OAM Data," Mar. 3, 2018, draft-weis-ippm-ioam-gre-00, The Internet Society, Reston, VA, USA (nine pages).

Ali et al., "Operations, Administration, and Maintenance (OAM) in Segment Routing Networks with IPv6 Data plane (SRv6)," Jul. 2, 2018, draft-ali-spring-srv6-oam-01.txt, The Internet Society, Reston, VA, USA (twenty-eight pages).

Previdi et al., "IPv6 Segment Routing Header (SRH)," Mar. 13, 2017, draft-ietf-6man-segment-routing-header-06, The Internet Society, Reston, VA, USA (thirty-five pages).

Baker and Bonica, "IPv6 Hop-by-Hop Options Extension Header," Mar. 16, 2016, draft-ietf-6man-hbh-header-handling-03, The Internet Society, Reston, VA, USA (ten pages).

Filsfils et al, "IPv6 Segment Routing Header (SRH)," Jun. 28, 2018, draft-ietf-6man-segment-routing-header-14, The Internet Society, Reston, VA, USA (twenty-nine pages).

"In-band OAM for IPv6," IPv6 Network Management Configuration Guide, Cisco IOS Release 15M&T, Jan. 26, 2018, Cisco Systems, Inc., San Jose, CA (thirty-six pages).

IPv6 Network Management Configuration Guide, Cisco IOS Release 15M&T, Nov. 21, 2012, Cisco Systems, Inc., San Jose, CA (ninety-six pages).

"Encapsulation Techniques: Generic Network Virtualization Encapsulation, VXLAN Generic Protocol Extension, and Network Service Header," White Paper, 2014, Cisco Systems, Inc., San Jose, CA (three pages).

Tom Herbert, "Re: [nvo3] [ippm] [Int-area] encapsulation of IOAM data in various protocols—follow up from WG discussion in London," Apr. 12, 2018, www.mail-archive.com/nvo3@ietf.org/msg05579.html, The Internet Society, Reston, VA, USA (six pages).

Mahalingam et al., "Virtual eXtensible Local Area Network (VXLAN): A Framework for Overlaying Virtualized Layer 2 Networks over Layer 3 Networks," Aug. 2014, RFC 7348, The Internet Society, Reston, VA, USA (twenty-two pages).

Sajassi et al., "BGP MPLS-Based Ethernet VPN," Feb. 2015, RFC 7432, The Internet Society, Reston, VA, USA (fifty-six pages).

J. Touch, "Recommendations on Using Assigned Transport Port Numbers," Aug. 2015, RFC 7605, The Internet Society, Reston, VA, USA (twenty-four pages).

Maino et al., "Generic Protocol Extension for VXLAN," Apr. 30, 2018, draft-ietf-nvo3-vxlan-gpe-06, The Internet Society, Reston, VA, USA (seventeen pages).

"Cisco Data Center Spine-and-Leaf Architecture: Design Overview," White Paper, 2016, Cisco Systems, Inc., San Jose, CA (twenty-seven pages).

Halpern and Pignataro, "Service Function Chaining (SFC) Architecture," Oct. 2015, RFC 7665, The Internet Society, Reston, VA, USA (thirty-two pages).

Quinn et al., "Network Service Header (NSH)," Jan. 2018, Jan. 2018, RFC 8300, The Internet Society, Reston, VA, USA (forty pages).

Guichard et al., "NSH and Segment Routing Integration for Service Function Chaining (SFC)," Jun. 18, 2018, draft-guichard-sfc-nsh-sr-02, The Internet Society, Reston, VA, USA (fifteen pages).

Kumar et al., "Service Function Simple Offloads," Apr. 2, 2017, draft-ietf-sfc-offloads-00, The Internet Society, Reston, VA, USA (seventeen pages).

"Internet Protocol," Sep. 1981, RFC 791, The Internet Society, Reston, VA, USA (forty-five pages).

Farinacci et al., "Generic Routing Encapsulation (GRE)," Mar. 2000, RFC 2784, The Internet Society, Reston, VA, USA (nine pages).

Brockners et al., "Proof of Transit," Oct. 30, 2016, draft-brockners-proof-of-transit-02, The Internet Society, Reston, VA, USA (twenty-three pages).

Brockners et al., "Proof of Transit," May 7, 2018, draft-brockners-proof-of-transit-05, The Internet Society, Reston, VA, USA (twenty-three pages).

Brockners et al., "Proof of Transit," Oct. 1, 2018, draft-ietf-sfc-proof-of-transit-01, The Internet Society, Reston, VA, USA (twenty-five pages).

PCT International Search Report and the Written Opinion of the International Searching Authority, PCT Application PCT/US2019/058577, ISA/EPO, European Patent Office, Netherlands, dated Feb. 7, 2020 (eleven pages).

* cited by examiner

COORDINATED OFFLOADED RECORDING OF IN-SITU OPERATIONS, ADMINISTRATION, AND MAINTENANCE (IOAM) DATA TO PACKETS TRAVERSING NETWORK NODES

TECHNICAL FIELD

The present disclosure relates generally to improved processing of packets in a packet switching network, including, but not limited to, adding operations data to packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
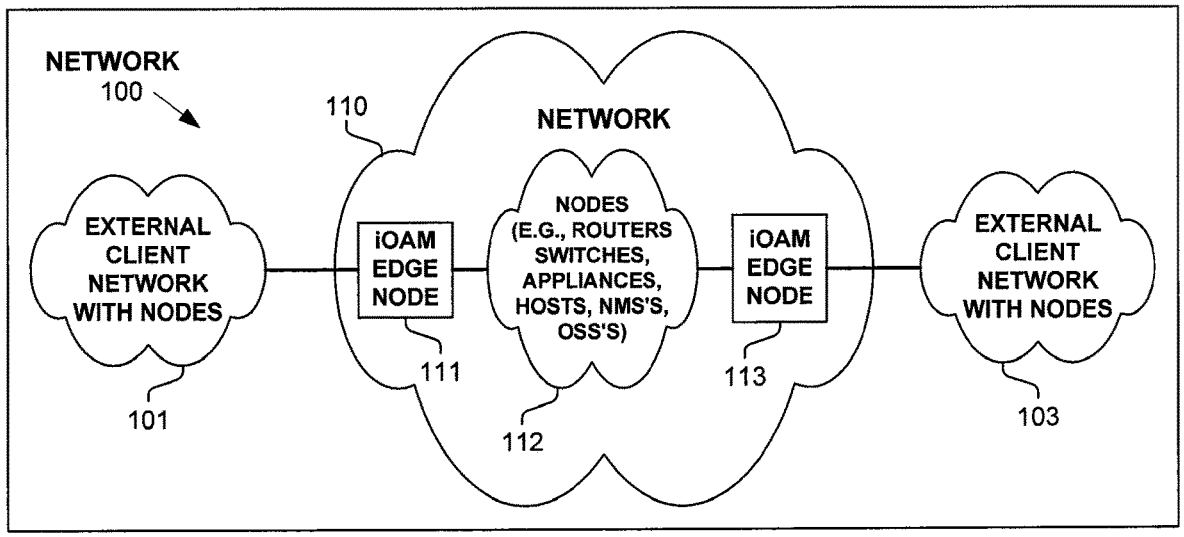
FIG. 1A illustrates a network operating according to one embodiment.

Disclosed are, inter alia, methods, apparatus, computer-storage media, mechanisms, and means associated with coordinated offloaded recording of In-Situ Operations, Administration, and Maintenance (IOAM) data to packets traversing network nodes.

In one embodiment, a first network node receives a packet via a network. The first network node adds first IOAM data and second IOAM data to the particular packet, with the first IOAM data related to the first network node and the second IOAM data related to a second network node. The particular packet is sent into the network from the first network node.

In one embodiment, adding of second IOAM data to the particular packet is performed in response to the first network node determining an IOAM processing capability or an IOAM processing state of the second network node indicates that the second network node would not add this second IOAM data to the particular packet. In one embodiment, the first network node receives one or more control plane messages identifying an IOAM processing capability or state of the second network node. In one embodiment, the IOAM processing state includes, but is not limited to, suspension of adding IOAM data to packets. In one embodiment, the second network node suspends adding IOAM data to packets in response to a resource utilization characteristic of the second network node.

In one embodiment, the first and second network nodes are neighbors in the network, such as, but not limited to, the second network node being a nexthop neighbor of the first network node. In one embodiment, the first IOAM data includes proof of transit (PoT) information identifying the first network node, and the second IOAM includes PoT information identifying the second network node. In one embodiment, a node or apparatus in the network includes one or more processing elements and memory and one or more interfaces sending and receiving packets.

2. Example Embodiments

Disclosed are, inter alia, methods, apparatus, computer-storage media, mechanisms, and means associated with coordinated offloaded recording of In-Situ Operations, Administration, and Maintenance (IOAM) data to packets traversing network nodes. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "data packet" refers to a standard packet communicating information (such as a customer data packet), with a probe packet (e.g., test packet) not being included in the definition of a data packet.

As used herein, "operations data" refers to operations, administration, maintenance (OAM) and/or provisioning (OAM-P) information (e.g., including operational and telemetry information), such as, but not limited to, in-band OAM data, or more specifically, In-Situ OAM Data. In one embodiment, the operations data is raw data, processed data, and/or data resulting from processing of other information. As used herein, "offloading" between network nodes is used to connote moving of a task (e.g., IOAM-related processing) from one entity (e.g., network node, process, network processor) to another entity.

In one embodiment, the operations data is related to data-plane and/or control-plane processing in the network (e.g., in a portion of, or the entire network). In one embodiment, the operations data is related to communication (including, but not limited to, verifying and/or discovering a path taken and/or performance measurement data or results) and/or other processing of packet(s) in a network. In one embodiment, the operations data is related to process(es), hardware, link(s), and/or other resources of one or more elements in the network (e.g., node(s), router(s), packet switching device(s), network management or other control system(s), host(s), server(s), apparatus, application processor(s), service devices(s), application processor(s), transmission and/or communications equipment). In one embodiment, operations data includes information related to the communication of a packet through a network, other protocol layer processing, and/or same layer processing.

In one embodiment, the operations data encompasses data related to one or more underlay protocols/networks. In one embodiment, the operations data encompasses data related to one or more overlay protocols/networks.

A typical use of IOAM is collects real-time operations data by embedding the operations data within actual data traffic. Such collected in-band telemetry data allows a network to instantly react to network events. IOAM data is typically inserted in packet headers of one or more protocols at one or more protocol layers. In one embodiment, IOAM data is recorded in a header of a network layer protocol (e.g., a Hop-by-Hop option will collect path and/or performance data from network elements at the network layer). In one embodiment, IOAM data is recorded in a header of a network layer protocol (e.g., Segment Routing (SRv6), Network Service Header (NSH), Generic Routing Encapsulation (GRE) to collect operations data from service nodes. Processing of the IOAM provides operations capabilities and improved network operations not available prior to IOAM.

In one embodiment, not all nodes record IOAM data in packets. For example, a network node might not be IOAM capable, or a capable node may suspend recording IOAM data due to current resource utilization (e.g., the processing load of the node is currently high, data structure or memory resources are low). Unaccounted for intermittent behavior in a network (e.g., such as related to adding and suspending adding IOAM data to a packets) provides great network operations problems.

In one embodiment, network nodes coordinate recording of In-Situ Operations, Administration, and Maintenance (IOAM) data in packets traversing the network nodes, including a node adding IOAM data of another node to packets on behalf of the another node. After receiving a particular packet, a network node adds first IOAM data and second IOAM data to the particular packet, with the first IOAM data related to the first network node and the second IOAM data related to a second network node. The packet is then sent from the first network node. The coordinated offloading of the adding of IOAM data to packets allows a node to free up resources currently used for IOAM operations to be used for other packet processing operations, while still having IOAM data related to the node recorded in packets. The coordinated offloading may include control plane communication (e.g., via a routing or other protocol). In one embodiment, IOAM data is offload added to a packet by an upstream node in the path taken by a packet. In one embodiment, IOAM data is offload added to a packet by a downstream node in the path taken by a packet.

FIG. 1A illustrates a network 100 (e.g., an aggregation of one or more networks of one or more different entities) operating using multiple protocol layers in processing packets (e.g., using overlay and underlay protocols/networks) according to one embodiment. As shown, network 100 includes client networks 101 and 103 (which are the same network in one embodiment) communicatively coupled to a provider network 110. In one embodiment, network 110 uses Segment Routing (SR), Multiprotocol Label Switching (MPLS), tunnels, Ethernet VPN (EVPN), Provider Backbone Bridging EVPN (PBB-EVPN), Internet Protocol version 4 and/or 6 (IP), and/or other encapsulating and/or packet forwarding technology.

In one embodiment, provider network 110 includes provider edge nodes 111 and 113, and a network 112 of network nodes, gateways, service functions, hosts (e.g., end nodes), network management, operations support systems, etc. In one embodiment, provider edge nodes 111 and 113 process packets received from networks 101 and 103, which may include encapsulating or otherwise processing these packets into Segment Routing packets such as by adding a SR header (and possibly another IP header) to these packets according to a data plane ascertained Segment Routing policy, and subsequently decapsulating or removing a Segment Routing header (and possibly another IP header) and forwarding the native (e.g., IP) packets into network 101 and 103. In one embodiment, edge nodes 111 and 113 perform ingress and egress processing of packets, including adding and extracting operations data fields and operations data to packets.

Figure 1B:
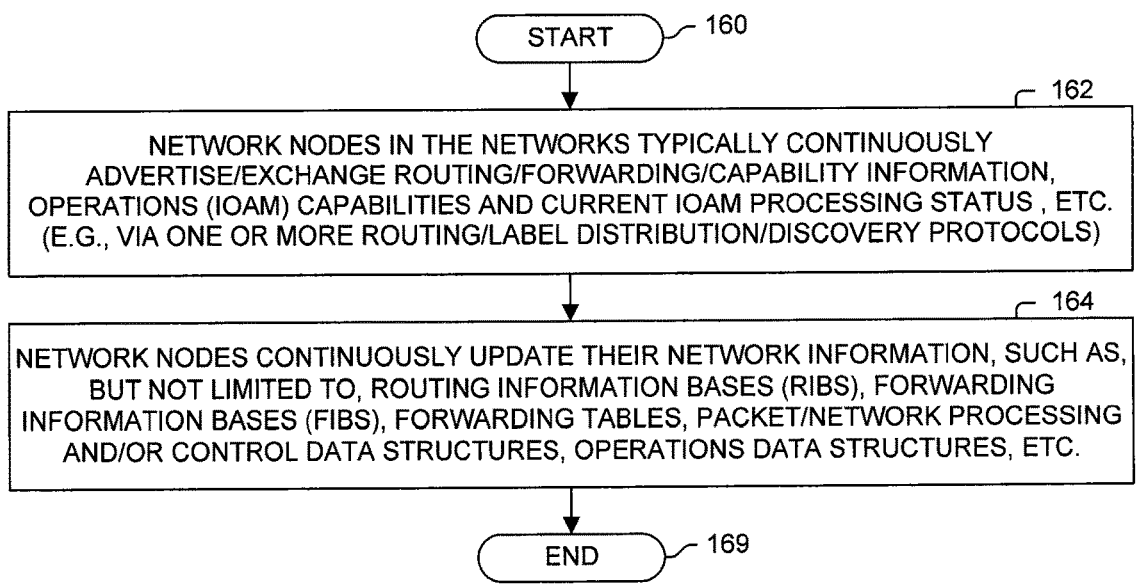
FIG. 1B illustrates a process according to one embodiment.

FIG. 1B illustrates a process according to one embodiment associated with coordinated offloaded recording of IOAM data to packets traversing network nodes. Processing begins with process block 160. In process block 162, network nodes in the networks typically continuously advertise/exchange routing, forwarding, IOAM, capability and state information (e.g., including operations capabilities and current operations processing state), etc., via one or more routing, label distribution, discovery, signaling and/or other control-plane protocols. In process block 164, the network nodes continuously update their network information, such as, but not limited to, Routing Information Bases (RIBs), Forwarding Information Bases (FIBS), forwarding tables, IOAM processing tables, packet/network processing and/or control data structures, operations data structures, etc. Processing of the flow diagram of FIG. 1B is complete as indicated by process block 169.

Figure 1C:
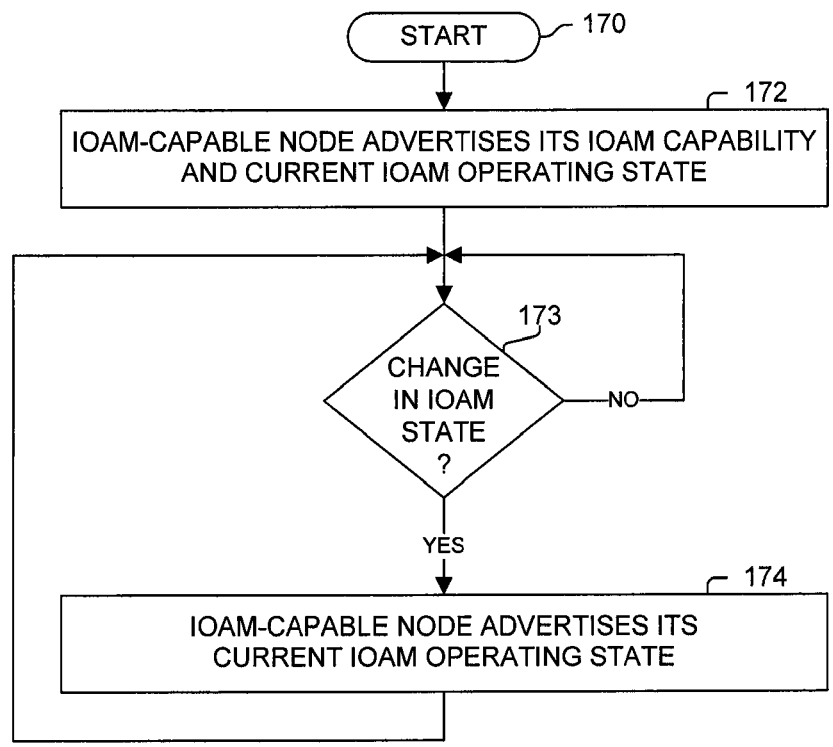
FIG. 1C illustrates a process according to one embodiment.

FIG. 1C illustrates a process performed by an IOAM-capable network node according to one embodiment associated with coordinated offloaded recording of IOAM data to packets traversing network nodes. Processing begins with process block 170. In process block 172, the network node advertises to other node(s) its IOAM capability and/or current IOAM state (e.g., performing full IOAM processing, performing a subset of IOAM processing—possibly identifying the subset, or suspending all IOAM processing). If the network node changes its IOAM state as determined in process block 173, then the IOAM-capable network node advertises its current IOAM state in process block 174. The processing loop returns to process block 173.

As used herein, "advertising" IOAM capability or state refers to communication of the IOAM capability or state to other network node(s), with the network possibly distributing this information throughout the network. A routing or other protocol used in one embodiment to advertise the IOAM capability and/or state includes, but is not limited to, Routing Information Protocols (RIP), Interior Gateway Protocol (IGRP), Open Shortest Path First (OSPF), Exterior Gateway Protocol (EGP), Enhanced interior gateway routing protocol (EIGRP), Border Gateway Protocol (BGP), and/or Intermediate System-to-Intermediate System (IS-IS). One embodiment advertises its IOAM capability and/or state using Link Local IGP Opaque LSA, BGP Extended Communities, Extended ARP, an IPv6 Neighbor Discovery option, and/or Router Capability in IGP.

Figure 1D:
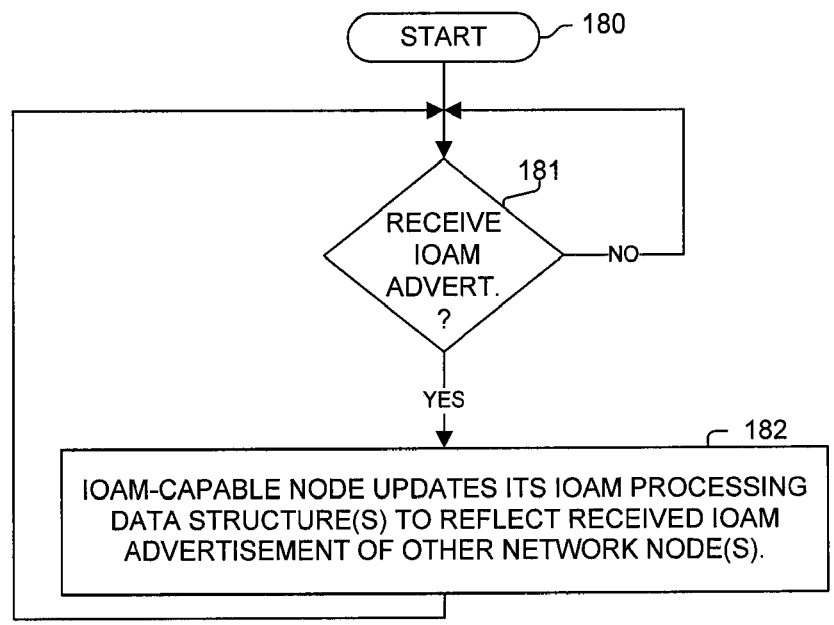
FIG. 1D illustrates a process according to one embodiment.

FIG. 1D illustrates a process performed by an IOAM-capable network node according to one embodiment associated with coordinated offloaded recording of IOAM data to packets traversing network nodes. Processing begins with process block 180. The processing loop remains at process block 180 until the network node receives an advertisement of an IOAM capability and/or state of another one or more network nodes; then in process block 182, the network node updates its IOAM processing data structure(s) to reflect the received IOAM advertisement of the other network node(s). The processing loop returns to process block 181.

Figure 2A:
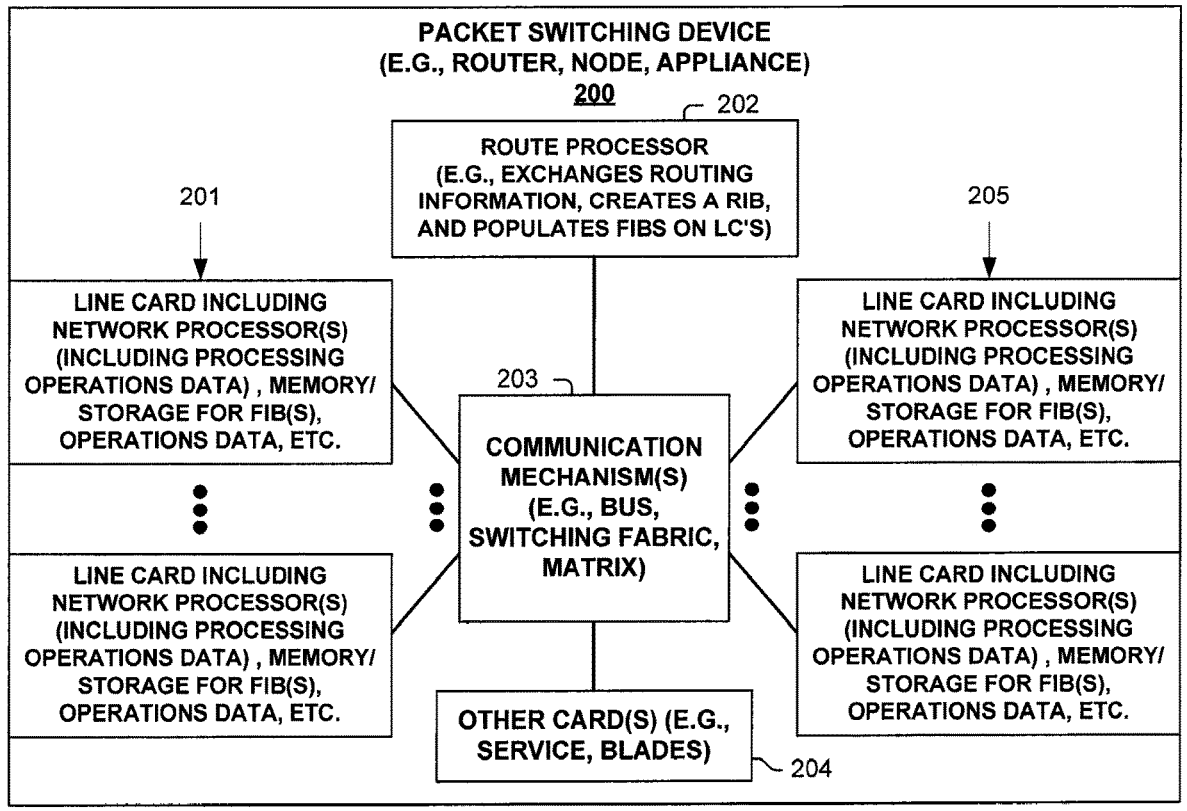
FIG. 2A illustrates a packet switching device according to one embodiment.
Figure 2B:
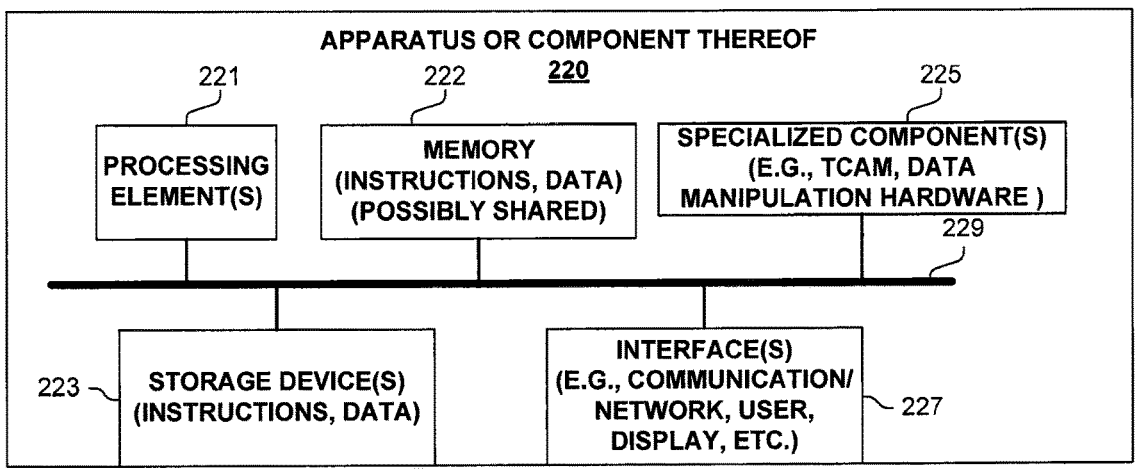
FIG. 2B illustrates an apparatus or component thereof according to one embodiment.

FIGS. 2A-B and their discussion herein provide a description of various network nodes according to one embodiment.

FIG. 2A illustrates one embodiment of a packet switching device 200 (e.g., router, node, switching, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with coordinated offloaded recording of IOAM data to packets traversing network nodes. Packet switching device 200 also has a control plane with one or more processing elements (e.g., Route Processor(s)) 202 for managing the control plane and/or control plane processing of packets associated with coordinated offloaded recording of IOAM data to packets traversing network nodes. Packet switching device 200 also includes other cards 204 (e.g., service cards, blades) which include processing elements that are used in one embodiment to process (e.g., forward/send, drop, manipulate, change, modify, receive, create, duplicate, perform operations data processing functionality, apply a service according to one or more service functions) packets associated with coordinated offloaded recording of IOAM data to packets traversing network nodes, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, operations data processing and storage functions are implemented on line cards 201, 205.

FIG. 2B is a block diagram of an apparatus 220 (e.g., host, router, node, destination, or portion thereof) used in one embodiment associated with coordinated offloaded recording of IOAM data to packets traversing network nodes. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit (s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
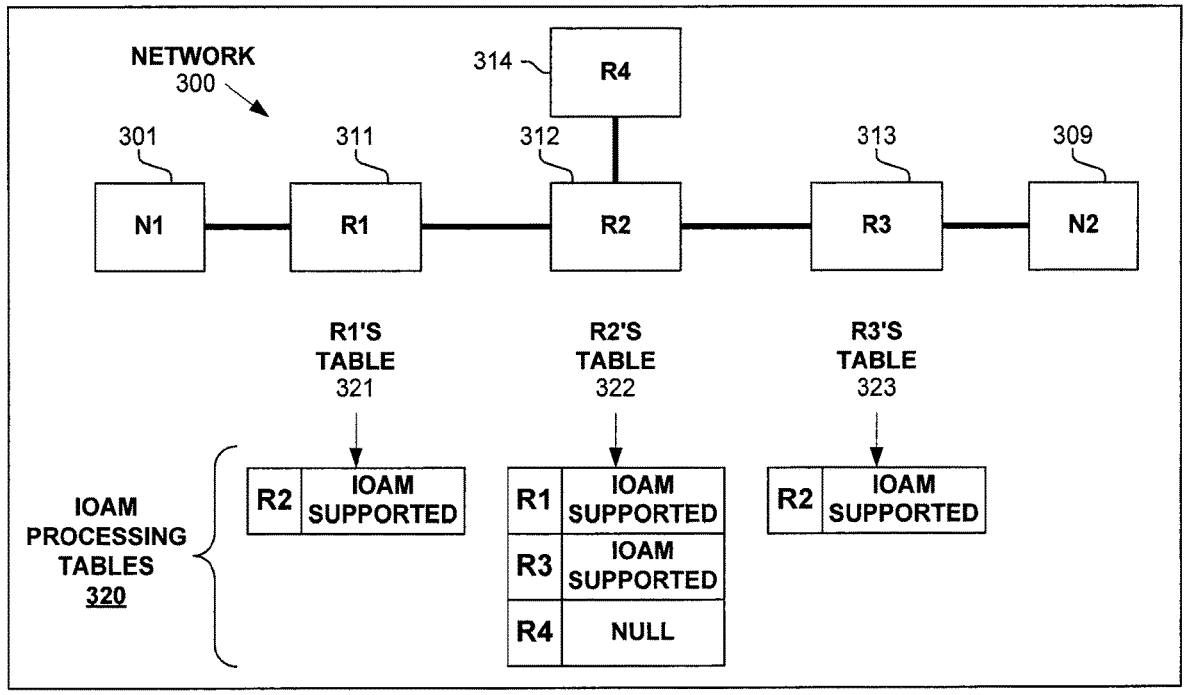
FIG. 3A illustrates a network operating according to one embodiment.

FIG. 3A illustrates a network 300 operating according to one embodiment. As shown, network 300 includes nodes N1 (301), R1 (311), R2 (312), R3 (313), R4 (314), and N2 (309). Also shown, and according to one embodiment, are IOAM processing tables 320, that include R1's IOAM processing table 321, R2's IOAM processing table 322, and R3's IOAM processing table 323. As R4 (314) is not IOAM capable, R2 (312) does not receive an IOAM capable advertisement from R4 (314), thus, R4's (314) entry in R2's IOAM processing table 322 is set to NULL.

In one embodiment, IOAM-capable nodes R1 (311), R2 (312) and R3 (313) advertise their IOAM capabilities, with the respective neighboring node storing this information in their respective network neighboring IOAM processing table 321-323. As reflected in IOAM processing tables 321-323, each of IOAM-capable nodes R1 (311), R2 (312) and R3 (313) have advertised that they are IOAM capable and either expressly or implicitly, that they are in a state of performing IOAM operations, including adding IOAM data (e.g., a node data list entry) related to itself.

Figure 3B:
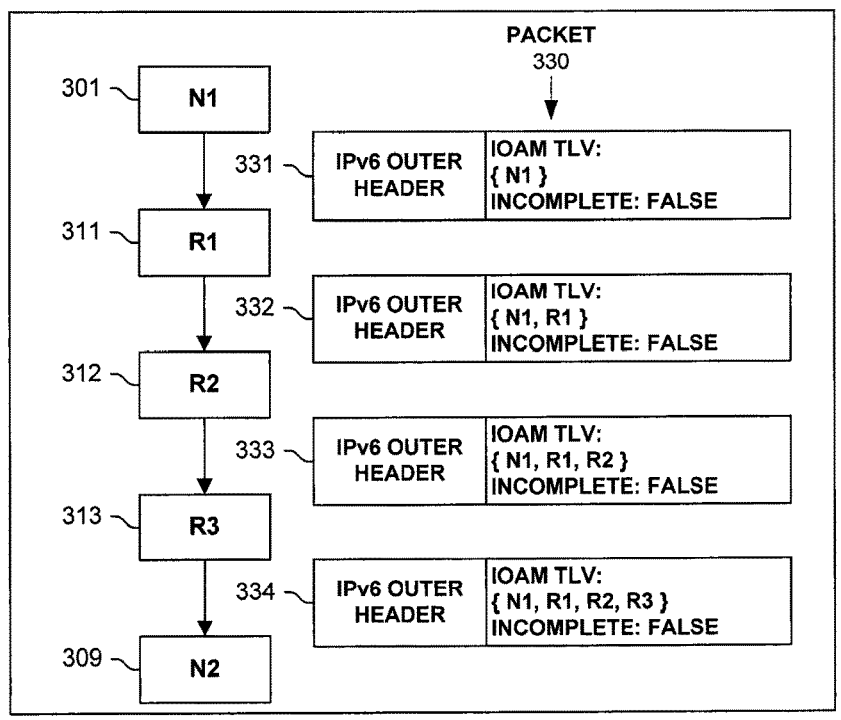
FIG. 3B illustrates a network operating according to one embodiment.

FIG. 3B illustrates the path (shown on the left-side, going from top of the page down) taken by packet (330) as it traverses network 300 (of FIG. 3A), including according to the current IOAM state reflected in IOAM processing table 321-323. As each of nodes R1 (311), R2 (312) and R3 (313) are in a state of performing IOAM processing, no IOAM offloading is performed as shown in FIG. 3B.

As shown, packet 330 includes an outer IPv6 outer header, with an IOAM Type-Length-Value (TLV) in an IP extension header. The TLV includes a node data list (storing data related to individual nodes); and an Incomplete Flag that when False identifies that there has been no offloading of adding IOAM data to packet 330, and when True identifies that there has been offloading of adding IOAM data to packet 330. Note, packet 330 is denoted also using reference numbers 331-334 for description purposes, but is still considered as being a same packet 330 traversing network 300.

As shown, N1 (301) sends packet 331, which is received by R1 (311).

R1 (311) processes received packet 331, including by adding IOAM data "R1" to the IOAM TLV and sending packet 332, which is received by R2 (312).

R2 (312) processes received packet 332, including by adding IOAM data "R2" to the IOAM TLV and sending packet 333, which is received by R3 (313).

R3 (313) processes received packet 333, including by adding IOAM data "R3" to the IOAM TLV and sending packet 334, which is received by N2 (309).

Figure 3C:
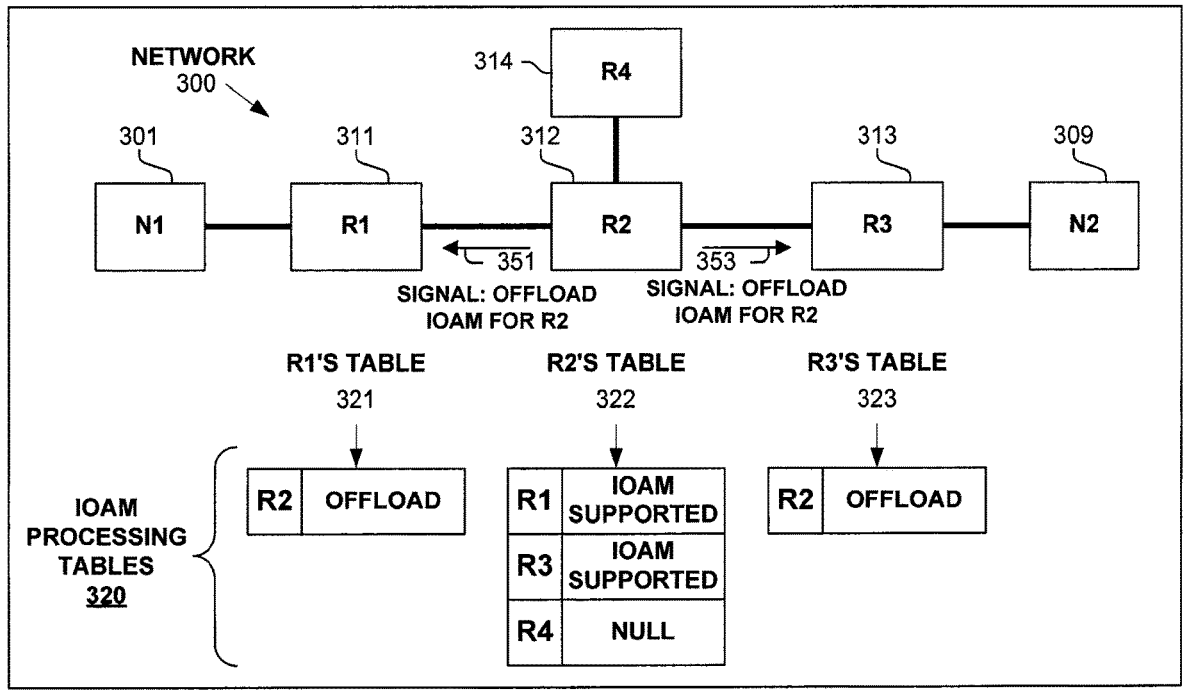
FIG. 3C illustrates a network operating according to one embodiment.

FIG. 3C illustrates network 300 (same network as shown in FIG. 3A) operating according to one embodiment. However, as shown in FIG. 3C, node R2 (312) signals (351, 352) to its neighboring nodes R1 (311) and R3 (313) that it is going to suspend adding IOAM data to packets (e.g., due to a resource limitation). In response to the received advertisements (351, 352), nodes R1 (311) and R3 (313) update the entry for R2 (312) in their respective IOAM processing table 321, 323 to reflect that R2's IOAM processing should be offloaded to nodes R1 (311) and R3 (313).

Figure 3D:
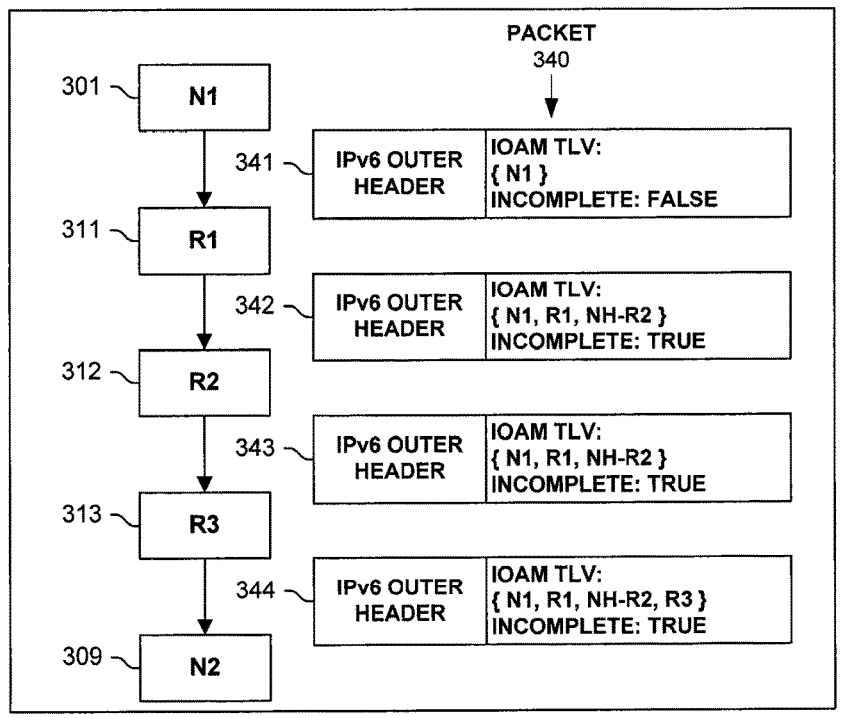
FIG. 3D illustrates a network operating according to one embodiment.

FIG. 3D illustrates the path (shown on the left-side, going from top of the page down) taken by packet (340) as it traverses network 300 (of FIG. 3C), including according to the current IOAM state reflected in IOAM processing table 321-323.

As shown, packet 340 includes an outer IPv6 outer header, with an IOAM Type-Length-Value (TLV) in an IP extension header. The TLV includes a node data list (storing data related to individual nodes); and an Incomplete Flag that when False identifies that there has been no offloading of adding IOAM data to packet 340, and when True identifies that there has been offloading of adding IOAM data to packet 340. Note, packet 340 is denoted also using reference numbers 341-344 for description purposes, but is still considered as being a same packet 340 traversing network 300.

As shown, N1 (301) sends packet 341, which is received by R1 (311).

R1 (311) processes received packet 341, including by:
adding IOAM data "R1" to the IOAM TLV;
offload IOAM processing (per R2's entry in R1's IOAM processing table 321) by adding IOAM data "NH-R2" (indicating nexthop/offload added IOAM data) to the IOAM TLV IOAM;
setting INCOMPLETE FLAG to TRUE; and
sending packet 342, which is received by R2 (312).

R2 (312) processes received packet 342 (without performing IOAM processing as this processing has been offloaded to another node), including by sending packet 343, which is received by R3 (313).

R3 (313) processes received packet 343, including by adding IOAM data "R3" to the IOAM TLV and sending packet 344, which is received by N2 (309).

Figure 4:
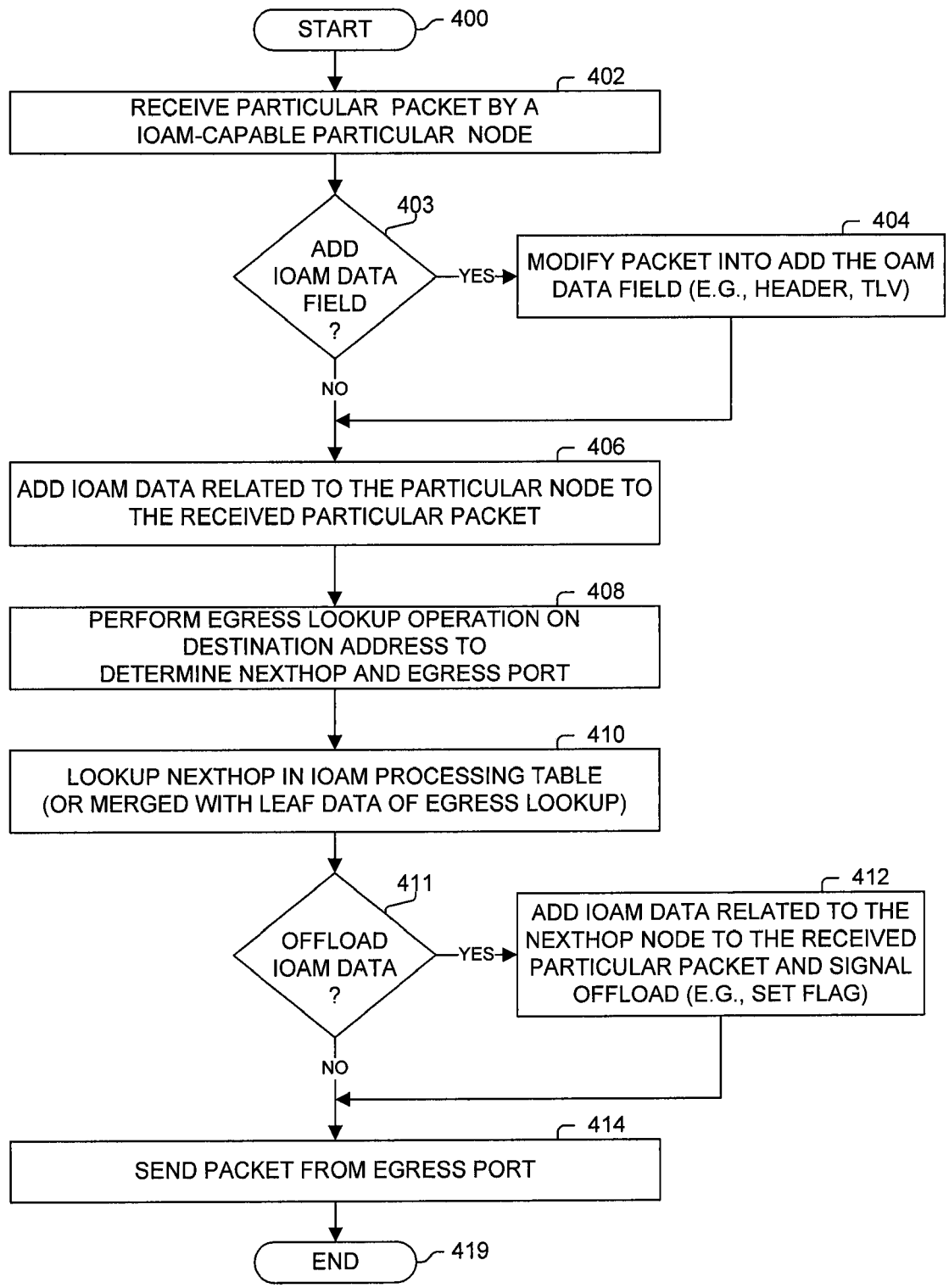
FIG. 4 illustrates a process according to one embodiment

FIG. 4 illustrates a process performed in one embodiment by a particular IOAM-capable network node currently in an IOAM state to perform IOAM processing of received packets.

Processing begins with process block 400. In process block 402, a particular packet is received by the particular node. As determined in process block 403, if the received packet does not include an IOAM data field required according to a corresponding policy for processing of the received packet, then in process block 404, this IOAM data field is added to the packet.

In process block 406, the particular adds IOAM data related to itself to an IOAM data field.

In process block 408, the particular node performs an egress lookup operation on a destination address in an egress forwarding information base (FIB), and identifies a nexthop neighbor (e.g., neighboring node in the network) and an egress port of the particular node.

In process block 410, the particular node performs a lookup operation based on the nexthop neighbor in a corresponding IOAM processing table. In one embodiment, the data of the IOAM processing table is added to leafs of the egress FIB.

As determined in process block 411, if the particular node is to perform offload IOAM processing (e.g., record IOAM data in the received packet) on behalf of the nexthop neighboring node, then in process block 412: IOAM data related to the nexthop node is added to the IOAM data field by the particular node on behalf of the nexthop node; and the particular node signals in the IOAM data field (e.g., sets or clears a flag, adds some value) to identifying that offload IOAM processing was performed on the received packet. In one embodiment, the particular node sets one or more IOAM details to NULL that the nexthop node would have added to the IOAM field and/or adding/updating other information (e.g., setting an IOAM value to a TTL of the particular packet in furtherance of identifying the node that offload added IOAM data on behalf of the nexthop node).

In process block 414, the packet (with the added and/or updated IOAM data) is sent from the egress port of the particular device.

Processing of the flow diagram of FIG. 4 is complete as indicated by process block 419.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   maintaining, by a first network node in one or more data structures, an operations processing offloading state of a second network node in a network, with the operations processing offloading state identifying whether the first network node is to offload particular operations processing from the second network node;
   receiving a particular packet, by the first network node;
   adding, by the first network node, first In-Situ Operations, Administration, and Maintenance (IOAM) data and second IOAM data to the particular packet, with the first IOAM data related to the first network node and the second IOAM data related to a second network node;
   sending the particular packet, including said added first and second IOAM data, from the first network node;
   wherein said second IOAM data is added to the particular packet in response to the operations processing offloading state identifying to perform said particular operations processing on behalf of the second network node, and wherein the first IOAM data includes proof of transit (PoT) information identifying the first network node, and the second IOAM includes PoT information identifying the second network node.

2. The method of claim 1, wherein the first and second IOAM data is added to a same IOAM header of the particular packet.

3. The method of claim 1, comprising updating the operations processing offloading state of the second network node in response to the first network node determining IOAM processing capability or IOAM processing state of the second network node indicating that the second network node would not add said second IOAM data to the particular packet.

4. The method of claim 3, wherein said determining IOAM processing capability or IOAM processing state of the second network node includes the first network node receiving a control plane message identifying said IOAM processing capability of the second network node or said IOAM processing state of the second network node.

5. The method of claim 4, wherein the control plane message is an advertisement via a routing protocol.

6. The method of claim 5, wherein the routing protocol is Interior Gateway Protocol (IGRP), Border Gateway Protocol (BGP), or Enhanced interior gateway routing protocol (EIGRP).

7. The method of claim 1, comprising receiving, by the first network, notification of an IOAM processing state that the second network node is suspending adding IOAM data to packets; and wherein said adding second IOAM data to the particular packet is performed in response to said received notification.

8. The method of claim 7, comprising the first network node receiving an IOAM processing capability notification of the second network node prior to said receiving said notification of the second network node suspending adding IOAM data to packets.

9. The method of claim 8, wherein the second IOAM data includes value representing that a network node added IOAM data to the particular packet on behalf of another node.

10. The method of claim 9, wherein first IOAM data includes proof of transit (PoT) information identifying the first network node, and the second IOAM includes PoT information identifying the second network node.

11. The method of claim 7, comprising the second network node said suspending adding IOAM data to packets responsive to a resource utilization characteristic of the second network node.

12. The method of claim 1, wherein the second IOAM data includes value representing that a network node added IOAM data to the particular packet on behalf of another node.

13. The method of claim 1, wherein the second IOAM data includes value representing that the first network node added IOAM data to the particular packet on behalf of the second network node.

14. The method of claim 1, wherein the second network node is a nexthop neighbor of the first network node.

15. The method of claim 1, wherein the first network node and second network node are neighboring nodes in the network.

16. A method, comprising:
   subsequent to a first network node acquiring a first notification that a second network node is capable of adding In-Situ Operations, Administration, and Maintenance (IOAM) data to packets, the first network node acquiring a second notification that the second network node is in a state of not adding IOAM data to packets;
   responsive to the second notification and for each first particular packet of a first plurality of packets, the first network node adding In-Situ Operations, Administration, and Maintenance (IOAM) data to an IOAM data field in said first particular packet and then sending said first particular packet from the first network node towards the second network node in a network, with the IOAM data including an indication of the second network node;
   acquiring, by the first network node, a third notification that the second network node is in a state of adding IOAM data to packets; and
   responsive to the third notification and for each second particular packet of a second plurality of packets, the first network node sending said second particular packet from the first network node towards the second network node in a network without adding IOAM data that includes an indication of the second network node.

17. A particular network node in a network, comprising:
one or more processing elements;
memory;
one or more interfaces sending and receiving packets; and
wherein the particular network node performs operations including:
maintaining, in one or more data structures, an operations processing offloading state of a second network node in the network, with the operations processing offloading state identifying whether the particular network node is to offload particular operations processing from the second network node;
receiving a particular data packet on one of said interfaces;
adding first In-Situ Operations, Administration, and Maintenance (IOAM) data and second IOAM data to the particular data packet, with the first IOAM data being operations data related to the particular network node and the second IOAM data being operations data related to the second network node; and
sending the particular data packet, including said added first and second IOAM data, from the particular network node;
wherein the particular network node and the second network node are neighboring nodes in the network; and wherein first IOAM data includes proof of transit (PoT) information identifying the first network node, and the second IOAM includes PoT information identifying the second network node;
wherein said second IOAM data is added to the particular data packet in response to the operations processing offloading state identifying to perform said particular operations processing on behalf of the second network node.

18. The particular network node of claim 17, wherein the operations processing offloading state is updated to identify to perform said operations processing on behalf of the second network node in response to the particular network node receiving notification that the second network node is suspending adding IOAM data to packets.

* * * * *